United States Patent [19]

Russell

[11] Patent Number: 4,461,738

[45] Date of Patent: Jul. 24, 1984

[54] METHOD OF CONTINUOUS EXTRUSION MOLDING

[75] Inventor: David B. Russell, Southborough, Mass.

[73] Assignee: Dennison Manufacturing Company, Framingham, Mass.

[21] Appl. No.: 73,341

[22] Filed: Sep. 7, 1979

[51] Int. Cl.³ .................. B29D 7/10; B29F 3/012
[52] U.S. Cl. ................... 264/145; 264/161;
264/163; 264/166; 264/167; 264/210.1;
264/288.8; 264/297.1
[58] Field of Search .............. 264/139, 145, 154, 161,
264/163, 166, 167, 291, 297, 158, 160, 197, 216,
210.1, 288.8

[56] References Cited

U.S. PATENT DOCUMENTS

| | | | |
|---|---|---|---|
| 2,922,193 | 1/1960 | Bonfiglio | 264/160 |
| 3,196,196 | 7/1965 | Burbank | 264/167 |
| 3,509,005 | 4/1970 | Hartig | 156/304 |
| 3,515,778 | 6/1970 | Fields et al. | 264/160 |
| 3,608,035 | 9/1971 | Frohlich | 264/166 |
| 3,825,643 | 7/1974 | Hillier et al. | 264/161 |
| 3,875,648 | 4/1975 | Bone | 24/150 FP |
| 4,159,300 | 6/1979 | Wise | 264/167 |
| 4,176,149 | 11/1979 | Moertel | 264/166 |

*Primary Examiner*—James B. Lowe
*Attorney, Agent, or Firm*—George E. Kersey; Barry D. Josephs; Arthur B. Moore

[57] ABSTRACT

Continuous molding of objects using a rotatable molding wheel with peripheral orifices in accordance with the objects to be molded. Plastic is extruded upon the periphery of the wheel and a knife in substantially eliptical contact is used to skive film from the objects being molded. Following molding, selected portions of the objects can be selectively distended. Suitable distention can be achieved using diverging sprocket wheels. When the continuously molded objects are fasteners with filament-like portions, the diverging sprocket wheels can be used to stretch the filamentary portions and reorient their molecules.

9 Claims, 18 Drawing Figures

FIG. IA
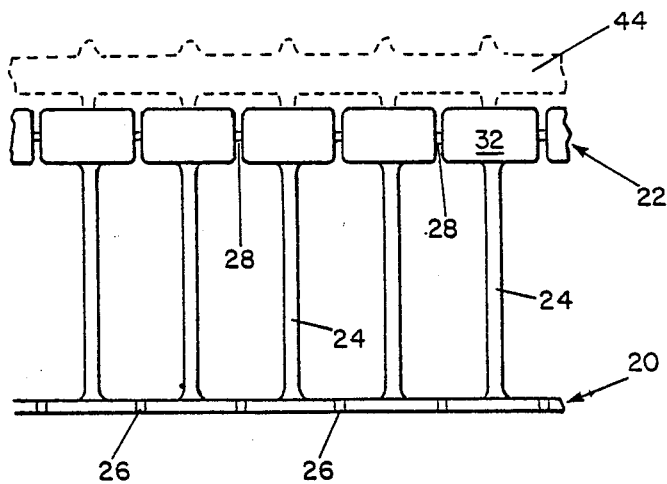
FIG. IB
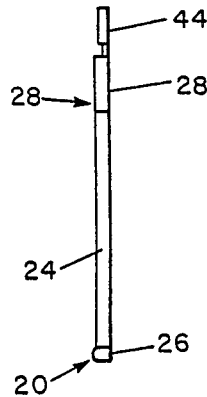
FIG. 2
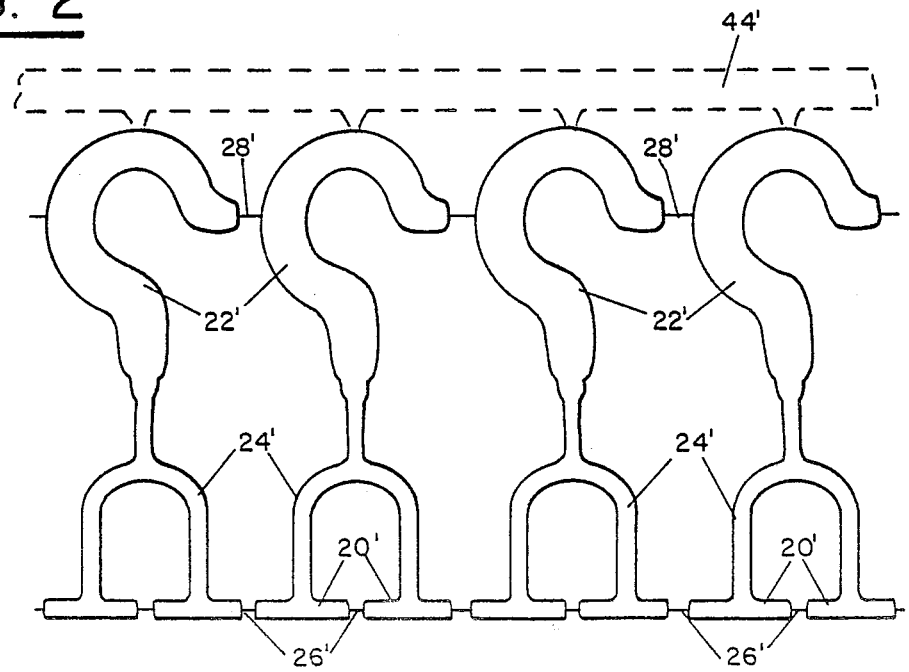

FIG. 5B
FIG. 5C
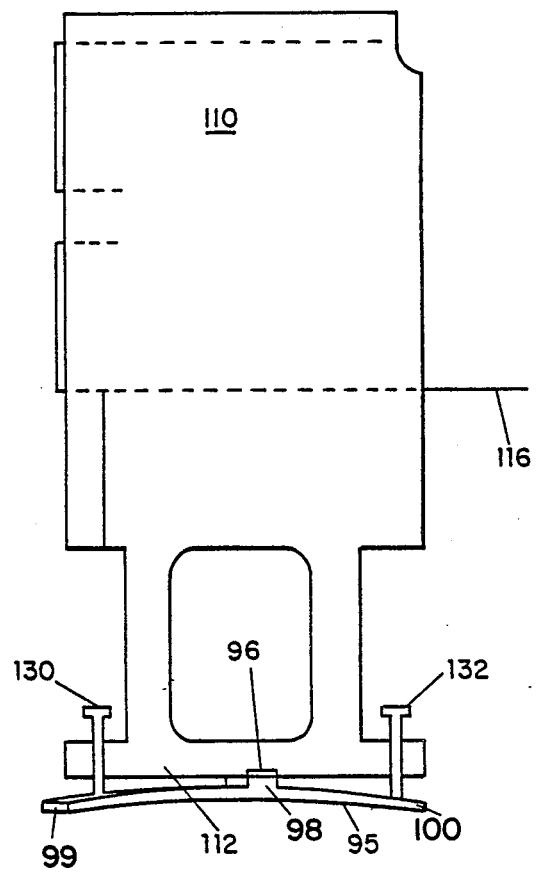
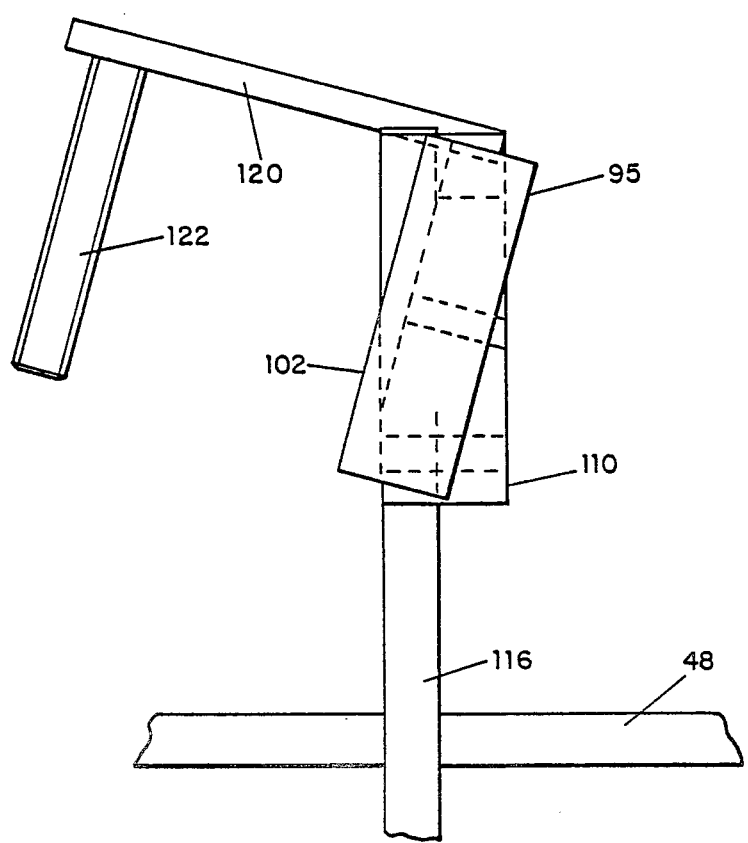

METHOD OF CONTINUOUS EXTRUSION MOLDING

BACKGROUND OF THE INVENTION

This invention relates to continuous molding and more particularly to the continuous molding of objects such as fasteners.

Many objects can be produced by molding. Examples are fasteners set forth and disclosed in U.S. Pat. Nos. 3,103,666; 3,185,367; 3,299,483; 3,399,432; 3,380,122; 3,444,597; 3,457,589; 3,470,834; 3,494,003; 3,650,451; 3,650,452; 3,652,004; 3,659,769; 3,733,657; 3,734,375; 3,759,435; 3,875,648; 3,893,612; 3,895,753; and 3,948,128; 4,039,078 and 4,121,487.

Plastic fasteners in accordance with the foregoing patents have been provided in assemblies of limited length for feeding sequentially through dispensing devices. In U.S. Pat. No. 3,103,666 the fasteners are in clip attached by severable necks to a runner bar. In U.S. Pat. No. 3,875,648 the fasteners are in the form of a stock of continuous side members cross-coupled by a plurality of filaments.

Fastener assemblies employing runner bars are limited in the number of items which can be conveniently supplied in a single assembly. The runners and associated connectors also waste material. While the fastener stock described in U.S. Pat. No. 3,875,648 partially overcomes these limitations, it has proved costly to produce such stock.

The continuous molding of plastic objects such as ribbed film, zipper fasteners, and the like has been proposed in U.S. Pat. Nos. 3,196,196; 3,394,413; 3,439,798; 3,445,915; 3,505,159; 3,509,005; and 3,515,778. However, the methods of these patents are not readily applicable to the molding of many objects, such as fastener stock. The dimensions of many objects are often small. Precision and uniformity are often required for subsequent use, and provision must often be made for clean spaces or "windows". Consistent molding without flash or filming is not easily achieved, and the removal of film raises many difficulties. Thus the removal or defilming of flash with heat as suggested in U.S. Pat. No. 3,509,005 can damage the stock. Skiving with a knife parallel to the axis of rotation is not practical since the knife will be substantially unsupported over the stock and can damage it.

Accordingly, it is an object of the invention to facilitate the continuous molding of objects, particularly plastic fastener stock. A related object is to facilitate the molding of attachment stock with transversely extending filaments.

Further objects of the invention include the improvement of the extrusion process, for example alignment of an extrusion orifice with the surface of a molding wheel, by provision of control over the parameters of the stock, and by alteration of the stock parameters without damage.

Another object of the invention is the provision of stock of consistent quality in rolls or assemblages of any desired length and quantity.

Still another object of the invention is to expedite the formation of fasteners for the attachment of items. A related object is to expedite the formation of assemblages of attachments.

Yet another object of the invention is to facilitate the stretching of continuously molded fasteners. A related object is to facilitate the stretching of continuously molded assemblages of attachments with transverse filaments. Other objects of the invention will become apparent from the description of the invention set forth below.

SUMMARY OF THE INVENTION

In accordance with the invention, a molding wheel is mounted for rotation about its axis and is provided with mold cavities about its periphery. The cavities are complimentary in shape to the desired stock. In the case of fasteners, the portion of the cavities corresponding to cross-members have edges at the wheel surface substantially parallel to the axis of rotation.

A manifold is provided with an arcuate surface substantially complementary to a portion of the peripheral wheel surface. The manifold has an orifice spaced from the adjacent wheel cavities. Plastic is extruded under pressure through an orifice of the manifold to fill the cavities and form over them a film of predetermined thickness.

A knife is used to skive the film from the plastic in the cavities. The knife is mounted to hold its cutting edge in substantially elliptical contact with the wheel surface at an angle to the axis of rotation. The desired elliptical contact can be provided by clamping one or more flexible thin blades in elliptically shaped jaws, or by providing one or more tapered blades which can be deflected as cantilevered beams to form an elliptical arc. A mechanism is preferably provided adjacent to and in advance of the knife to hold the plastic in the cavities during skiving.

To provide alignment between the orifice of the manifold and the surface cavities in the molding wheel, as well as to maintain a controlled thin film over the cavities, it is desirable for the manifold to have a surface complementary to a portion of the wheel and an orifice slightly recessed from the wheel. The recessed orifice is at a controlled distance, and the manifold is preferably mounted on the extruder by a universal joint. A suitable universal joint is a ball and socket joint with a ball fixed to the extruder. A fluid passage through the universal joint communicates with the orifice. The socket is provided by a complementary cavity in the rear of the manifold and a clamp secures the manifold to the ball. This permits a small movement of the manifold in any direction when the wheel is brought into molding position. It also provides automatic alignment. The wheel desirably has circumferentially extending bearing surfaces on either side of its cavities, and the complementary manifold surface includes bearing surfaces on either side of the manifold orifice.

In operation, the wheel is moved against the manifold, rotated and hot plastic under pressure is extruded through the ball and manifold orifice. This fills the cavities and forms a film over them of several thousandths of an inch in thickness, for example about 2 mils. The wheel is advanced from the orifice to a skiving position where the knife skives the film from the fastener stock at an angle to the wheel's axis of rotation, and the stock and film are removed. The film is recyled through the extruder. Any suitable pressure used to extrude plastics can be employed, for example from several hundred to one thousand or more pounds per square inch.

The stock may be further treated, in the case of fasteners, for example, to stretch the cross-members. In particular, the cross-members of fasteners are stretched by being engaged by members which are spaced apart and rotate in non-parallel planes. In accordance with one aspect of the invention the engagememt members rotate and the fasteners are integrally formed from stock with opposed side rails with cross links.

The engagement members, which are desirably in the form of wheels, have a minimum peripheral separation which is no greater than the portion of each fastener that is to be stretched, and diverge at least to a maximum peripheral separation corresponding to the portion after stretching.

Each engagement wheel preferably has a plurality of radial projections spaced apart at the cross link intervals. In addition the mounting of the wheels is desirably made adjustable to vary the angle of divergence and thus the amount of stretching imparted to each cross link.

In operation the fastener stock is fed continuously into engagement with the rotating engagement wheels. The cross links of the stock are then stretched by the diverging wheels and the stretched stock is thereafter removed by continuing the rotation of the wheels, which converge and thus release the tension of the stretched fasteners.

DESCRIPTION OF THE DRAWINGS

Other aspects of the invention will become apparent after considering several embodiments of the invention taken in conjunction with the drawings in which:

FIG. 1A is a plan view of a set of objects in the form of fasteners fabricated in accordance with the invention;

FIG. 1B is a side view of the objects of FIG. 1A;

FIG. 2 is a plan view of another set of objects in the form of a further set of fasteners fabricated in accordance with the invention;

FIG. 5B is a front view of the knife and mount of FIG. 5A;

FIG. 5C is a bottom plan view of the wheel and skiving knife;

DETAILED DESCRIPTION

Figure 3A:
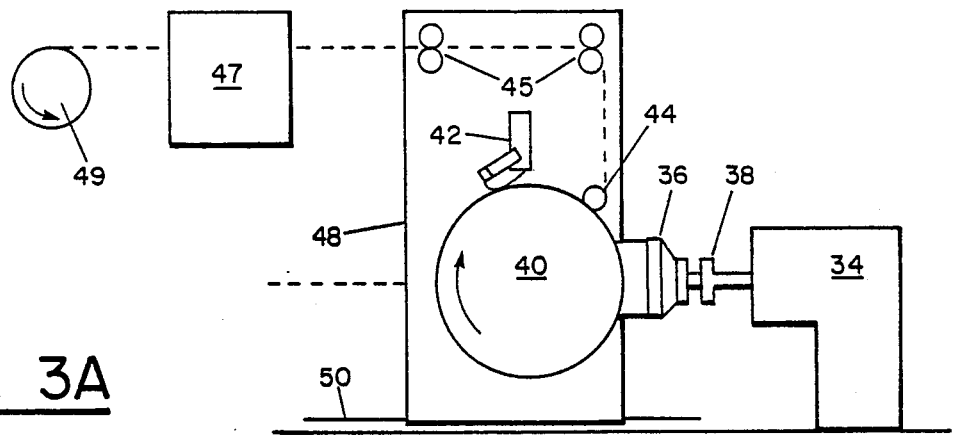
FIG. 3A is schematic elevational view of a continuous molding in accordance with the invention.

With reference to the drawings, FIGS. 1 and 2 illustrate types of fastener stock which are readily fabricated in accordance with the invention. It will be understood that other objects can be fabricated as well. This stock of FIGS. 1A and 1B is more fully described in copending application Ser. No. 827,276, filed Aug. 24, 1977, the disclosure of which is incorporated by reference.

The stock of FIGS. 1A and 1B includes end members 20 and 22 and a plurality of spaced filamentary cross-members 24. The members 20 are provided with connectors 26 of reduced cross section and the end members 22 are similarly provided with connectors 28. The stock further includes a molding strip 44 which is separated from the stock after fabrication and before use.

In use, the connectors 26 and 28 may be severed from the stock to provide individual fasteners, each with a transverse bar 20 and a paddle 32 at opposite ends of a flexible filament 24. The transverse bar 20 may be fed through the bore of a hollow needle for the joining or tagging of objects.

Another kind of stock in accordance with the invention is shown in FIG. 2. This stock also includes end members 20' and 22' and a plurality of spaced leg members 24'. The end members 20' are provided with connectors 26' and the end members 22' are similarly provided with connectors 28'. As before a molding strip 44' is included which is removed from the stock before use.

The individual fasteners of FIG. 2 include two leg members 24' and one corresponding end member 22'. The head portion 22' is in the form of a hook that can be used to hang merchandise, such as socks from rods after the end members 24' have been driven into, for example, respective socks of a pair. The driving mechanism may again employ a hollow needle through which the end members are driven.

A molding system according to the present invention is shown schematically the side elevation in FIG. 3A. The system includes an extruder 34, a manifold assembly 36, a manifold mount 38, a rotatable molding wheel 40, a skiving knife and hold-down assembly 42, a take-off roll 44, transfer rolls 45 and a windup roll 49.

The fastener stock may be passed prior to wind-up through stretching apparatus 47 of any suitable type, for example as shown in FIGS. 6A through 6E, below, to decrease the size of filaments 24 and increase their strength and flexibility. A mounting plate 48 is provided for mounting the knife 42 and transfer rolls 45. The axis of rotation for the wheel 40 extends through the plate 48. The plate 48 together with a mechanism (not shown) located behind the plate for driving the wheel and rolls may be mounted on one or more rails 50 for moving the molding wheel 40 toward and away from the manifold 36.

Figure 3B:
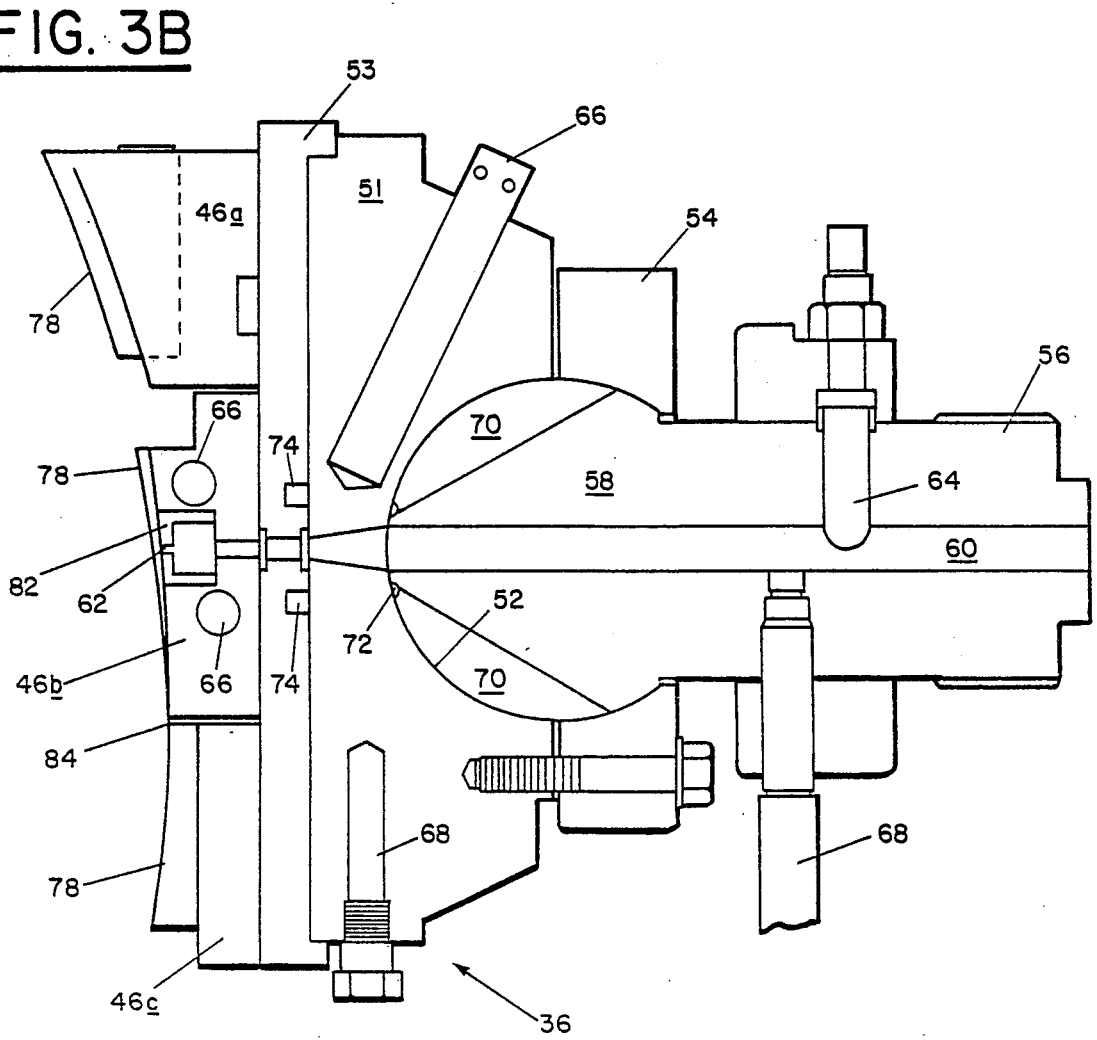
FIG. 3B is a vertical section of the manifold and the mount for the apparatus of FIG. 3A.
Figure 3C:
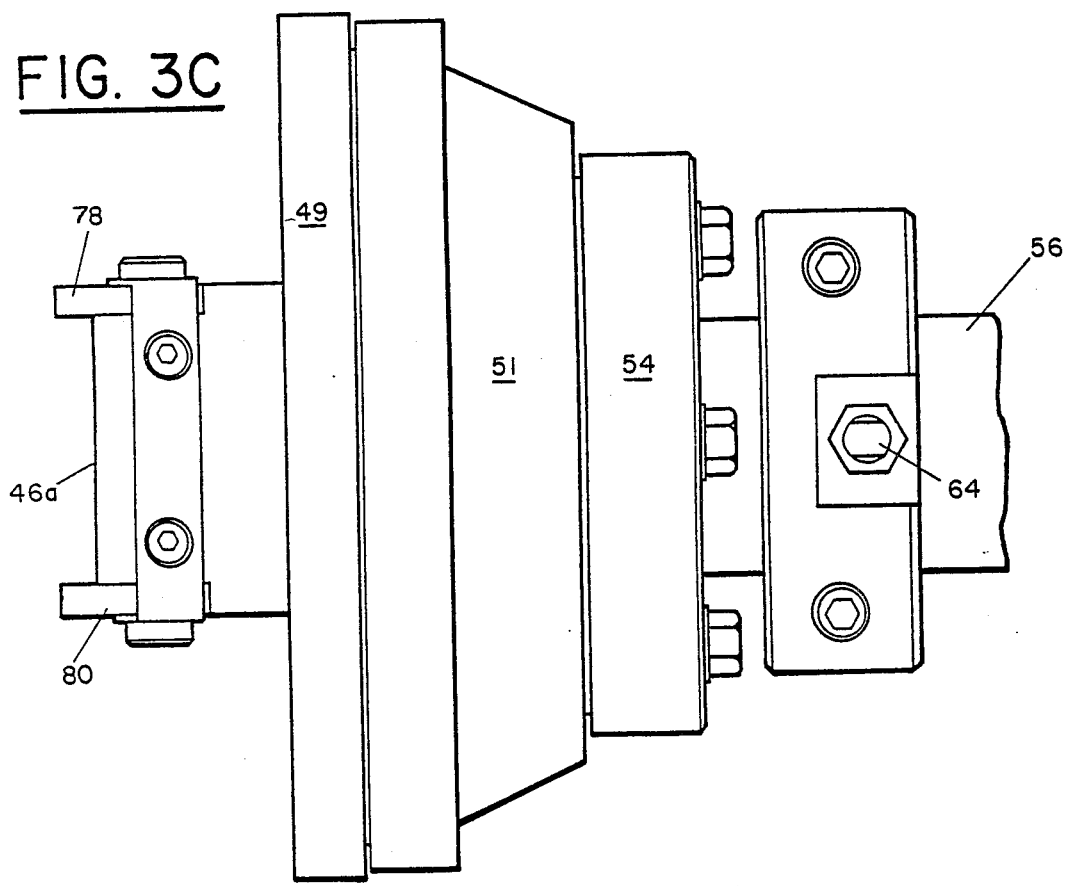
FIG. 3C is a plan view of the apparatus of FIG. 3B.
Figure 3D:
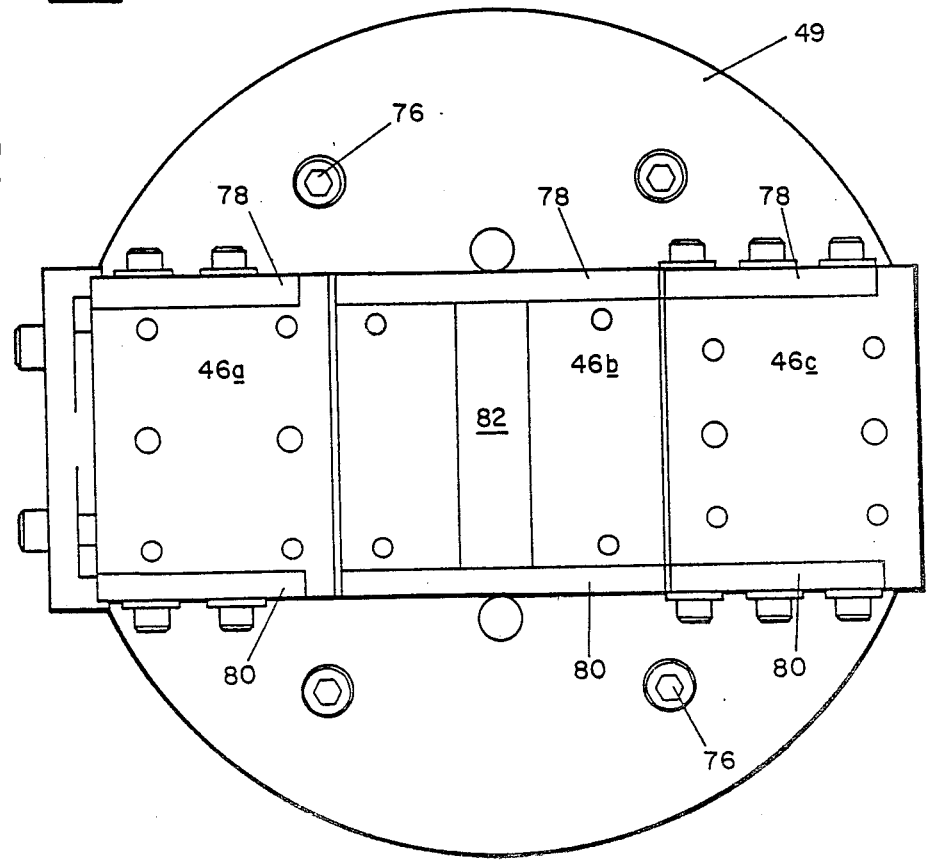
FIG. 3D is a front view of the manifold shown in FIG. 3B.
Figure 3E:
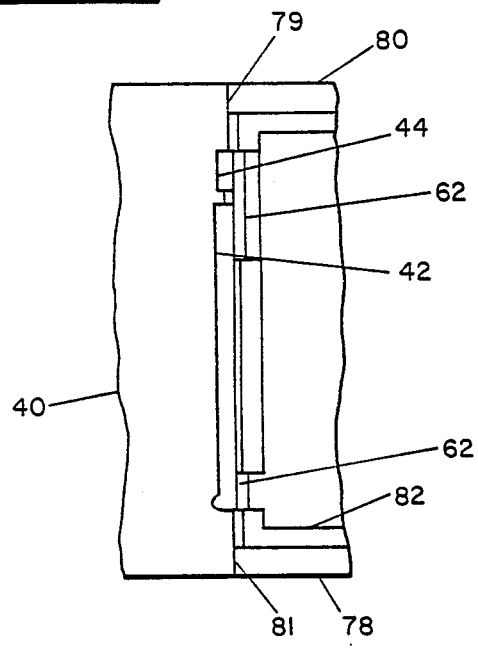
FIG. 3E is a partial horizontal section on the line E—E of FIG. 3A.

As shown in FIG. 3E, the wheel 40 is provided with a series of circumferential cavities 42 complementary in shape to the fastener stock. Indicated by broken lines in FIGS. 1A and 1B is a disposable feed strip 44. This aids in filling the cavities and supports the stock during removal and handling. A corresponding cavity 44' is provided in the surface of the whel 40. The strip 44 is joined to the end member 22 by a plurality of frangible connectors by which it can be removed and recycled to the extruder. If desired, the molding wheel 40 can be provided with an additional circumferential set of cavities fed from the opposite side of strip 44 to form simultaneously two strips of fastener stock.

The manifold 36 and its mounting assembly are shown in enlarged FIGS. 3B-3D. The manifold assembly 36 comprises a curved portion 46, provided in three segments 46a, 46b and 46c for convenience of construction and handling, a mounting plate 53, a main plate 51 having in its rear face a ball socket 52 not subtstantially exceeding a hemisphere in size, and a clamp 54. The manifold 36 is mounted on a rod 56 which terminates in ball 58. The rod 56 is in turn rigidly mounted on the extruder 34. The rod 56 and ball 58 are provided with a passageway 60 to provide fluid communication between the extruder and the orifice 62 in the manifold 36. Projecting into the passageway 60 is a rounded flow rod 64 which is adjustably inserted into passageway 60 to control the flow of plastic and aid in mixing. The manifold and ball assembly are heated by a plurality of electrical heaters 66 and suitable temperature transducers 68 are provided to monitor temperature.

As shown in FIG. 3B, the manifold base plate 51 is mounted over the end of the ball 58 and the clamp 54 bolted thereto to secure it in position. The cavity in plate 51 and clamp 54 provide a socket for the ball 58. The cavity and ball form a universal joint which permits universal movement of the manifold with respect to the extruder to automatically align the manifold with the wheel.

The ball 58 is provided with a plurality of grooves 70 through which plastic under pressure may exit between plate 51 and clamp 54 in the event the wheel and manifold assembly become blocked. A sealing ring 72 is provided on the surface of the ball socket 52 which seals the grooves 70 during normal operation. Relief slots 74 may also be provided in plate 49 for a similar purpose.

Figure 4A:
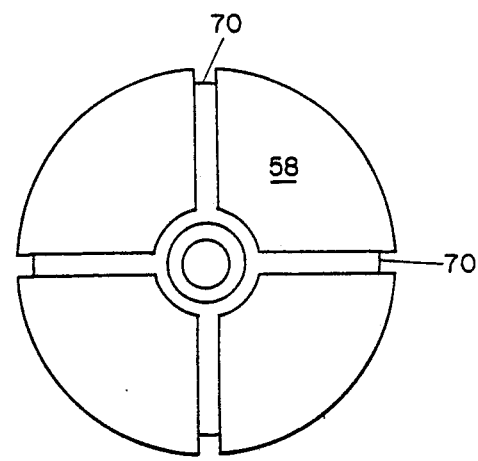
FIG. 4A is a front view of the ball employed to mount the manifold of FIG. 3B.
Figure 4B:
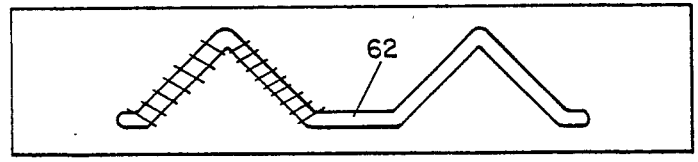
FIG. 4B is a front view of an orifice insert for the manifold of FIG. 3A.

As shown in FIG. 3D, the arcuate segments 46a, 46b and 46c are bolted to the plate 49 which is in turn bolted to the plate 51 by bolts 76. Segments 46 include bearings 78 and 80 at each outer edge which bear against bearing surfaces 79 and 81 on the wheel 40, the wheel bearing surfaces 79 and 81 (FIG. 3E) extending circumferentially around the wheel on either side of the molding cavities. The middle segment 46b is provided with an insert 82 which is in fluid communication with the passageway 60 and which terminates at its outer surface with orifice 62 of any suitable shape, for example as shown in FIG. 4B. By employing an insert, the orifice can be readily changed in response to wear or to the requirements of different molding wheels. The insert 82 is secured in the segment 46b by any suitable means, for example by brazing.

The outer surface of the manifold portion 46 adjacent the molding wheel and intermediate the bearing surfaces 78 and 80 is recessed slightly by an amount sufficient to form a controlled film over the molding cavities of a thickness of a few mils, preferably about 2 mils. While the recess may be uniform, it is sufficient to provide such clearance at one point downstream of the orifice, for example, at the edge 84 of segment 46b. Elsewhere, the clearance may be greater. As shown in FIG. 3B, the recess is increased from edge 84 upstream of the molding wheel by an arc substantially equal in radius to that of the molding wheel but with its center of rotation above the center of rotation of the wheel. The recess downstream in segment 46c may be substantially greater as shown.

As shown in FIG. 3A, the wheel is rotated past the manifold 36 where the mold cavities are filled with fluid plastic under pressure and a uniform film formed thereover, and the wheel is rotated approximately 270 degrees to the skiving knife assembly 42 where the film is removed by skiving. The mold is cooled, for example with water, to solidify the plastic in the cavities.

Since the cavities required to mold plastic fastener stock of the type described herein have a succession of transverse cavities of substantial length, it is not possible to skive the film from the surface of the wheel at a cutting line parallel to the axis of rotation. Some pressure is required to hold the cutting edge against the wheel which will cause the knife to deflect into the cavity with resulting damage. It is therefore necessary to place the knife edge at an angle to the wheel axis of rotation. This requires substantially an eliptical arc of contact and a cutting edge with a corresponding eliptical shape. This eliptical shape can be provided by one or more thin flexible blades, such as razor blades, mounted in the clamping jaws of a holder in which the contacting surfaces of the jaws are machined or otherwise formed in the required eliptic shape. Preferably, two such blades are employed.

More preferably, the knife is machined from thicker and stiffer metal. The knife blade can be machined to the required shape, for example, according to the equation:

$$X^2 = \text{SIN}^2 A + Z^2 + (D/2)^2,$$

where X is the horizontal axis, Z is the vertical axis, A is the skew angle, and D is the diameter of the molding wheel. However, the machining of such blades is expensive and there is no simple way to sharpen it.

A satisfactory blade of uniform thickness cannot be provided by deflecting its ends, while holding the center fixed, because the resulting beam curvature is proportional to the bending moment and decreases from the center support to the tip. This is the opposite of the curvature required in an ellipse. It ahs been found however that the beam can be tapered from a thick portion, either at the center or at one end, to decrease the moment of inertia of the beam enough to overcome the effect of the decreasing bending moment and, as a new result, yield a beam whose curvature increases outwardly in substantially an elliptical arc. The blade 95 has a center support 96 attached to the thick center 98 in which the upper surface of the blade is linearly tapered toward each tip 99 and 100. The required angle of taper for any given wheel, may be determined by trial and error. The approximate taper may also be calculated, conformity determined on the molding wheel, and final adjustments made by slowly increasing the taper. One such method of calculation is disclosed in an article entitled: "DEFLECTION AND SLOPE IN TAPERED BEAMS", Baumeister and Sebrosky, *Machine Design*, Dec. 28, 1972. The taper can also be approximated by solving the following equation, assuming a slight taper as an initial approximation:

$$d^2y/dx^2 = -M/EI = -12W(L-x)/Ew\{h_2 + h_1 - h_2/L(L-x)\}^3$$

where x is the absissa, y is the ordinate, L is the beam length W is the force applied to the end of the beam, $h_1$ is the beam height at the support end, $h_2$ is the beam height at L, w is the beam width, M is the bending moment, and I is the moment of inertia.

In use, the knife edge should be tipped slightly, for example about 5 degrees, to the center tangent of the wheel. While not essential, a slight increase in taper to compensate for such tipping is beneficial. The knife can be tipped in any suitable manner. The upper surface of support 96 is machined at 5 degrees to the horizontal for mounting to a horizontal plate as described below.

Figure 5A:
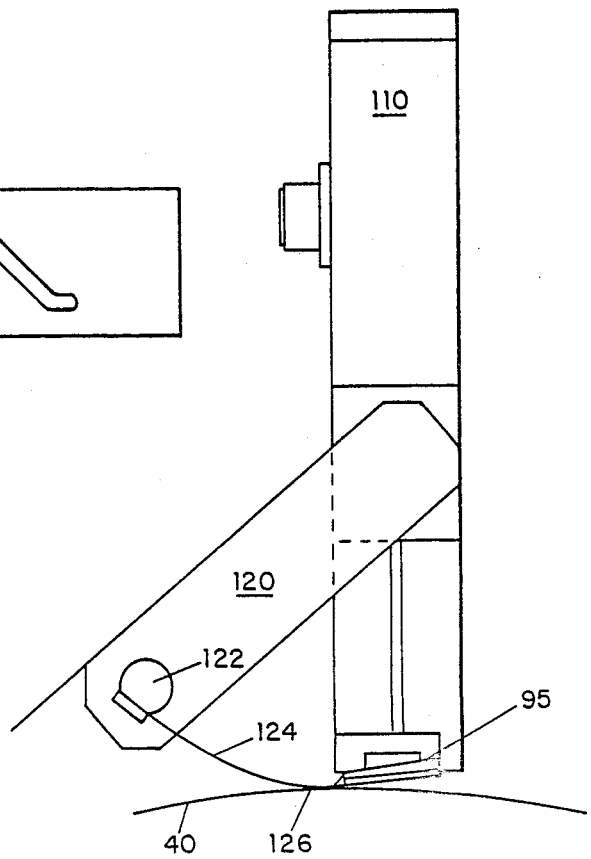
FIG. 5A is a side view to an enlarged scale of the skiving knife and mounting means therefor.

A mount for the knife 95 is shown in FIGS. 5A–5C. It includes a plate 110 terminating in a horizontal base 112 to which the center support 96 of the blade 95 is bolted. Base 112 has its center line parallel to the axis of rotation of the molding wheel and has two locating bolt holes for the support 96 which are located off-center to dispose the knife at the desired skew angle, for example 15 degrees, as shown in FIG. 5C. Adjustable screws 130 and 132 are provided at the ends of base 112 to deflect the ends of knife 95 to contact the surface of the wheel. As shown in FIGS. 5B and 5C, plate 110 is secured to plate 116 when extends through plate 48. An arm 120 is fixed to plate 110 and carries a rod 122 to which a flexible spring finger 124 is secured to dispose its free end 126 in contact with the surface of the plastic film immediately in advance of the knife, for example by a distance of about 20 mils. As shown in FIG. 5C, arm 120 is bolted to plate 110 at an angle which permits a flat rectangular spring to be employed. While a single tapered blade 95 is illustrated, supported in the center and tapering toward each end, two or more blades can be employed one or more of which are mounted at one end and tapered toward the other end.

The optional stretching mechanism 147 of FIG. 3A can take a variety of forms. One suitable form makes use of diverging sprocket wheels as shown in FIGS. 6A through 6D.

For simplicity the fastener stock 11 (FIG. 6E) is formed by longitudinally extending side members 10a and 10b which are joined together at regular intervals by a succession of unstretched, transversely extending cross connectors 12. It will be appreciated that the fastener stock 11 can be made in any suitable fashion and take a wide variety of forms. The fastener stock typically is a unitized plastic structure manufactured, for example, of nylon, polyethylene, polypropylene, polyurethane, or other similar material.

The only limitation on the stretching is that it not exceed the tensile limit of the material. Individual fasteners are provided from the stretched stock by severing the side members 10a and 10b between adjoining filaments 12 to provide a fastener with cross bars on the opposite ends of each filament.

Figure 6A:
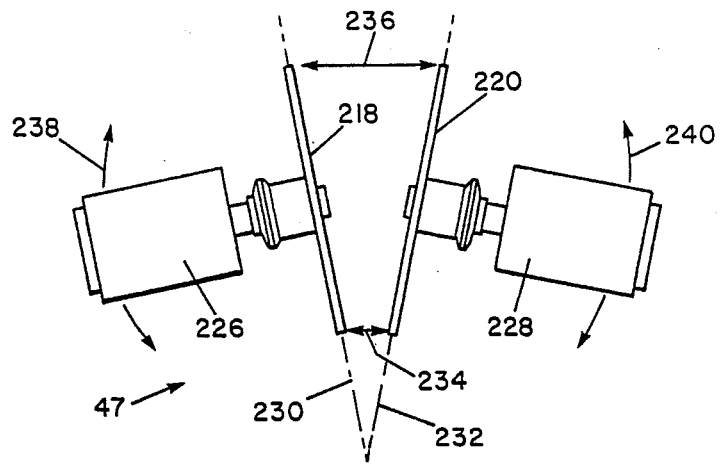
FIG. 6A is a view of stretching apparatus for use in the system of FIG. 3A in accordance with the invention.

With reference to FIG. 6A, an apparatus 47 for stretching stock in accordance with the invention is formed by a pair of rotatable wheels 218 and 220 with projections 222 and 224 spaced around their peripheries for engaging successive cross members of the stock at intervals substantially equal to their distances of separation. The wheels 218 and 220 are rotated by synchronous motors 226 and 228 at substantially the same speed, and are angularly mounted with respect to one another such that extensions 230 and 232 of their planes of rotation converge in an acute angle. As a result, the wheels have a position of maximum convergence 234 and a position of maximum divergence 236 at an angular displacement of 180°.

The motors 226 and 228 are pivotally mounted to permit variation of the angle between the wheels as indicated by the arrows 238 and 240. This can be accomplished by using clamping bolts in an arcuate track (not shown). A change in the angle between the wheels 218 and 220 and the accompanying variation in the divergence 236, permits different lengths of stretched filaments to be made from a single length cross bar.

Figure 6B:
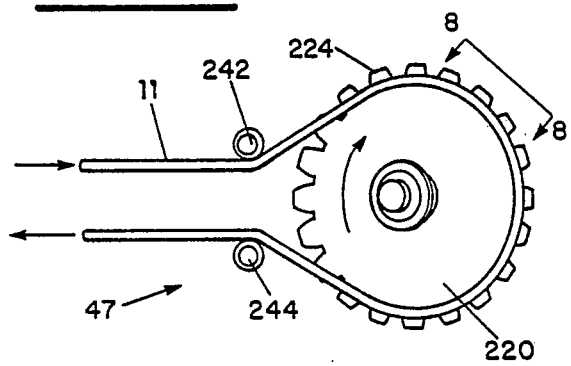
FIG. 6B is a side view of the apparatus of FIG. 6A showing the stretching of fastener stock.
Figure 6C:
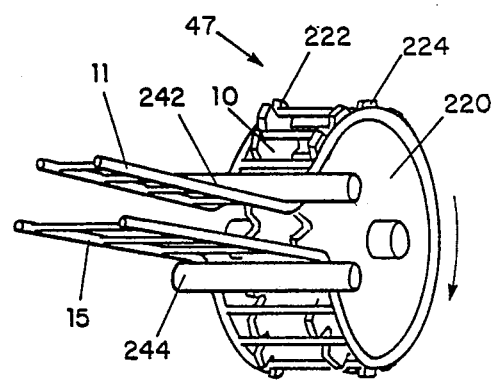
FIG. 6C is a perspective view of the rearward engagement portion of the apparatus of FIG. 6A.
Figure 6D:
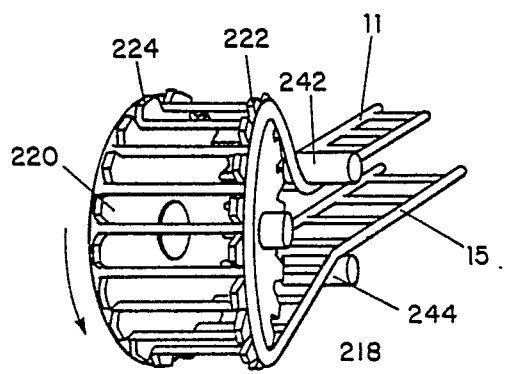
FIG. 6D is a perspective view of the diverging frontal portion of the apparatus of FIG. 6A.
Figure 6E:
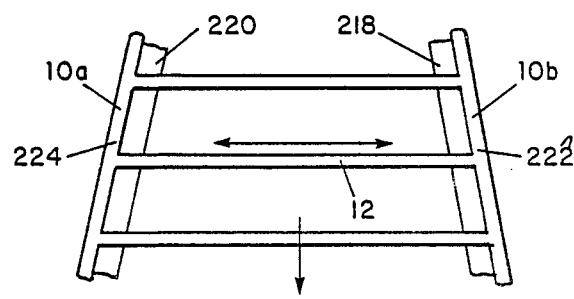
FIG. 6E is an enlargement of a portion of FIG. 6B illustrating the stretching of fastener stock in accordance with the invention.

As indicated in FIG. 6B the unstretched fastener stock 11 is fed mechanically or manually under a feed bar 242 and over projections of the two wheels, such as the projections 224 of the wheel 220, at a point where the wheels converge with a distance between them no greater than the length of the unstretched cross connector 12. Opposed pairs of projections, such as the projections 222 and 224 as shown in FIG. 6C engage opposite ends of each cross connector to advance and simultaneously stretch the connectors as the wheels diverge. Stretching continues until the wheels 218 and 220 reach their position of maximum divergence 236, after which, as indicated in FIG. 6D, pairs of projections converge and release the stretched filaments. The stretched stock is then removed at a bar 244, as illustrated in FIGS. 6C and 6D.

The only condition imposed on the wheels 218 and 220 is that they lie in converging planes. The point of maximum convergency 234 of the wheels 218 and 220 is illustratively less than the length of any unstretched cross connector 12, and the point of maximum divergency 236 is equal to the length of the stretched filament. If desired, however, the gap 234 may equal to length of the unstretched connector and the maximum divergency 236 may be somewhat greater than the desired length of the stretched filament, especially where the plastic material possesses resilience. It has been found, for example, that the stretching of fastener stock in accordance with the invention is beneficial even where the material stock is so resilient that it returns to nearly its original length after stretching.

While the unstretched fastener stock 11 is shown being fed onto the projections at the peripheries of the wheels near the position 234 of maximum convergence, the stock may be fed at any other position where the wheels are spaced apart a distance no greater than the length of the unstretched cross connectors 12. Similarly, it is preferred that the stretched stock be advanced beyond the position of maximum stretching 236 to facilitate removal. However, the stretched stock may be forcibly withdrawn at an earlier position, particularly if the maximum divergency 236 exceeds the desired stretched length of the fastener.

Fixed peripheral projections are preferred and shown for retaining the fastener stock on the engagement wheels. Any other suitable retainer, however, may be employed. For example, the peripheries of wheels 218, 220 may be grooved to receive end members 10a and 10b with clamps that retain the end members in the grooves during stretching.

It should be further understood that the present invention includes all modifications and equivalents within the scope of the appended claims.

What is claimed is:

1. A method for continuously molding plastic fastener stock of the type having elongate substantially parallel end members cross-coupled by a plurality of cross-members and from which individual fasteners including one of the cross-members may be severed, the method comprising as steps:

(a) providing a molding wheel mounted for rotation about its axis and having on its circumference mold cavities complementary in shape to the fastener stock, the portion of the cavities corresponding to the cross-members having edges at the wheel surface substantially parallel to the axis of wheel rotation, (b) rotating the wheel past a substantially fixed orifice, (c) extruding plastic under pressure into the cavities to fill them and form thereover a thin continuous film, (d) and thereafter skiving the film from the plastic in the cavities at an angle to the axis of rotation of the wheel while resiliently holding the plastic in the cavities.

2. Method of stretching fastener stock formed by the method of claim 1 comprising longitudinally joined side members that are cross coupled at predetermined intervals by transversely extending stretchable connectors, comprising divergingly engaging the fastener stock at spaced apart positions of the connectors to stretch them into flexible filaments.

3. A method for continuously molding plastic stock comprising the steps of:

(a) providing a movable mold having cavities on an outer surface thereof.

(b) extruding plastic material into said cavities and simultaneously forming a continuous film above said cavities, and (c) skiving said film from the plastic material in said cavities at an angle with respect to the axis of motion of said mold.

4. The method of claim 3 wherein the plastic stock is stretched after removal from said mold.

5. The method of claim 4 wherein said stretching is accomplished by divergingly engaging said stock.

6. A continuous molding method comprising the steps of (a) rotating a molding wheel about an axis thereof, said molding wheel having surface cavities therein, (b) providing a universally mounted manifold having a surface that is substantially complimentary to a portion of the surface of said molding wheel;

(c) injecting plastic material onto said molding wheel through said manifold to fill said cavities and form a film thereover, (d) skiving from said wheel, said film after the formation thereof.

7. The method of claim 6 wherein said plastic material is held in said cavities during skiving.

8. The method of claim 28 wherein the skiving produces an elliptical arc pattern for the film separated from the plastic material of said cavities.

9. The method of claim 8 wherein the desired elliptical trajectory is achieved using a plurality of blades.

* * * * *

UNITED STATES PATENT AND TRADEMARK OFFICE
CERTIFICATE OF CORRECTION

PATENT NO. : 4,461,738
DATED : July 24, 1984
INVENTOR(S) : David B. Russell

It is certified that error appears in the above—identified patent and that said Letters Patent is hereby corrected as shown below:

Col. 6, line 26, the equation should read:

$$X^2 \sin^2 A + Z^2 = (D/2)^2.$$

Col. 6, lines 58 and 59, the equation should read:

$$d^2y/dx^2 = -M/EI = -12W(L-x)/Ew[h_2+(h_1-h_2)(L-x)/L]^3.$$

Examination is not required since the equation was not included with the Specification.

Signed and Sealed this

Seventeenth Day of May, 1988

*Attest:*

DONALD J. QUIGG

*Attesting Officer*     *Commissioner of Patents and Trademarks*